United States Patent
Kim et al.

(10) Patent No.: US 9,589,337 B2
(45) Date of Patent: Mar. 7, 2017

(54) APPARATUS AND METHOD FOR RECOVERING IMAGES DAMAGED BY WEATHER PHENOMENA

(75) Inventors: Hong Yeom Kim, Suwon-si (KR); Kyoung Ho Lee, Suwon-si (KR)

(73) Assignee: NEXTCHIP CO., LTD., Seongnam-si (KR)

(*) Notice: Subject to any disclaimer, the term of this patent is extended or adjusted under 35 U.S.C. 154(b) by 177 days.

(21) Appl. No.: 14/390,766

(22) PCT Filed: May 16, 2012

(86) PCT No.: PCT/KR2012/003825
§ 371 (c)(1),
(2), (4) Date: Oct. 24, 2014

(87) PCT Pub. No.: WO2013/151208
PCT Pub. Date: Oct. 10, 2013

(65) Prior Publication Data
US 2015/0043818 A1    Feb. 12, 2015

(30) Foreign Application Priority Data
Apr. 4, 2012    (KR) .................. 10-2012-0035092

(51) Int. Cl.
*G06T 5/00* (2006.01)
*G06T 5/40* (2006.01)
*H04N 5/232* (2006.01)

(52) U.S. Cl.
CPC .............. *G06T 5/40* (2013.01); *G06T 5/009* (2013.01); *H04N 5/23229* (2013.01)

(58) Field of Classification Search
None
See application file for complete search history.

(56) References Cited

U.S. PATENT DOCUMENTS 5,982,386 A * 11/1999 Fujimoto .............. G06T 7/0083
                                                    345/443
8,073,286 B2 * 12/2011 David ...................... G06K 9/40
                                                    382/254
(Continued)

FOREIGN PATENT DOCUMENTS

CN        1753489 A       3/2006
CN       101888536 A     11/2010
(Continued)

OTHER PUBLICATIONS

Yang, et al., "Image Enhancement Analysis in Intelligent Transportation System," Dec. 1, 2009, pp. 30-313.
(Continued)

*Primary Examiner* — Bernard Krasnic
(74) *Attorney, Agent, or Firm* — McDermott Will & Emery LLP

(57) ABSTRACT

The present invention relates to an apparatus and method for recovering images damaged by weather phenomena, including: an input unit for receiving an image; a damaged image detection unit for detecting an image damaged by weather phenomena; an image recovery unit for recovering the damaged image; and an output unit for outputting the recovered image, wherein the damaged image recovery unit can recover the contrast and/or color of the damaged image.

20 Claims, 9 Drawing Sheets

(56) References Cited

U.S. PATENT DOCUMENTS

| | | | |
|---|---|---|---|
| 8,111,943 B2* | 2/2012 | Jobson | G06T 5/003 382/206 |
| 2005/0069207 A1* | 3/2005 | Zakrzewski | B64D 45/0015 382/190 |
| 2008/0075385 A1* | 3/2008 | David | G06K 9/40 382/275 |
| 2008/0110556 A1* | 5/2008 | Kawasaki | B60W 40/072 156/238 |
| 2009/0016636 A1* | 1/2009 | Kasashima | B60R 1/00 382/274 |
| 2010/0040300 A1* | 2/2010 | Kang | G06K 9/00664 382/255 |
| 2010/0322478 A1* | 12/2010 | Nitanda | G06T 5/002 382/103 |
| 2011/0135200 A1* | 6/2011 | Chen | G06T 5/003 382/167 |
| 2013/0039544 A1* | 2/2013 | Robert | G06K 9/00791 382/104 |

FOREIGN PATENT DOCUMENTS

| | | |
|---|---|---|
| CN | 102202163 A | 9/2011 |
| JP | 2005-176076 A | 6/2005 |
| JP | 2007-251719 A | 9/2007 |
| JP | 2010-287183 A | 12/2010 |
| KR | 10-2001-0069800 A | 7/2001 |
| KR | 10-2010-0135117 A | 12/2010 |

OTHER PUBLICATIONS

Hu, et al., "Recognition of Vision Blocked Weather Phenomena Based on Dichromatic Atmospheric Scattering Model," Nov. 1, 2010, pp. 1-6.

* cited by examiner

APPARATUS AND METHOD FOR RECOVERING IMAGES DAMAGED BY WEATHER PHENOMENA

CROSS-REFERENCE TO RELATED APPLICATIONS

This application is a U.S. national stage application of International Application No. PCT/KR2012/003825 filed on May 16, 2012, which claims the benefit of Korean Patent Application No. 10-2012-0035092 filed on Apr. 4, 2012, in the Korean Intellectual Property Office, the entire disclosures all of which are incorporated herein by reference for all purposes.

TECHNICAL FIELD

The present invention relates to a technology for recovering an image captured and damaged in a weather environment, for example, fog, yellow dust, and the like.

The present invention is derived from research conducted as a part of the industry original technology development project of the Ministry of Knowledge Economy. Research information is further described below.

| | |
|---|---|
| Project unique number | 10040246 |
| Department | Ministry of Knowledge Economy |
| Research management specialized organization | Korea Evaluation Institute of Industrial Technology |
| Research business name | Industry original technology development project |
| Research project name | Development of module and robot vision SoC for real-time object recognition and acquisition of 3D depth information through stable image acquisition of mobile robot |
| Managing department | Korea Electronics Technology Institute |
| Research institute | 2011 Jun. 01~2015 May 31 |

BACKGROUND ART

In a daily life, in a place in which weather phenomena, for example fog, yellow dust, and the like, occur, an outline of an object becomes blurred, and a color of the object is changed. Additionally, an extremely short distance may be recognized, in comparison to a general situation.

In a short viewing distance, traffic inconvenience may occur, and a risk of an accident in all connections, for example vehicles, ships, aircrafts, and the like, may be increased.

In the above situation, when an image is captured, a dynamic range may be reduced, and it is difficult to properly bring a camera into focus, in comparison to looking with human eyes. Accordingly, the viewing distance may be further reduced.

A color of an object in a place in which weather phenomena, for example fog, yellow dust, and the like, occur may be affected by a weather environment, for example fog, yellow dust, and the like, and may be changed in comparison to a general situation. Accordingly, it is difficult to accurately perceive the object.

Because an image obtained by capturing an object in a weather environment, for example fog, yellow dust, and the like, is not determined to depict the object in a lifelike manner. Accordingly, the image may be determined to be damaged, and may be referred to as a damaged image.

FIG. 1 illustrates an example of modeling a process of inputting light to a camera in a foggy situation.

A sensor 101 of the camera may generate an image by a direct transmission, that is, light emitted from a light source 103 and reflected from an object 102.

For example, the image may be damaged by a thick fog 104.

To the sensor 101, a reflect transmission, that is, light emitted from the light source 103 and reflected from the fog 104, as well as the light source 103 may be input. The fog 104 may include fine particles in air.

In other words, the sensor 101 may generate a damaged image by receiving, as inputs, the direct transmission together with the reflect transmission.

An image damaged by a weather environment, for example fog, yellow dust, and the like, may be formed by inputting light reflected by fine particles in air together with light reflected from an object. Accordingly, visibility in the image may be reduced, and colors may be blurred. It may be difficult to recognize and perceive the image.

In a place exposed to a change in a weather environment, for example fog, yellow dust, and the like, an image may not be normally obtained by a surveillance camera, a camera for vehicles, and the like, that are installed outside a building, because the image may be damaged by the weather environment. Accordingly, all functions of the surveillance camera, the camera for vehicles, and the like may be useless.

In other words, due to a damaged image, a camera may not normally operate as a main purpose of installation of the camera, and a large number of functions, for example an image stabilization, a movement detection, prevention of a vehicle collision, road lane recognition, and the like, may not be properly used.

Detection and interpretation of an image damaged by a weather environment, for example fog, yellow dust, and the like, may be omitted, or may not be properly performed. The detection and interpretation may be limited as a technology needing to be used selectively by a user, instead of being automatically used and accordingly, it is impossible to use a camera as a surveillance camera that is not frequently adjusted by a user.

Based on an environment, a situation, and the like in which an image is captured, a performance of a result obtained by recovering the image may be greatly changed. Based on an intensity of a weather environment, for example fog, yellow dust, and the like, an intensity and an arrangement of neighboring light sources, and the like, a performance of a recovery result may be lower than before an application of a technology.

In image processing technologies for recovering a damaged image according to a related art, it is difficult to realize a function, for example surveillance, and the like, in real time.

To recover a damaged image using a technology according to a related art, an iterative and complex algorithm may be applied to a single image, and a relatively long period of time from a few seconds to a few minutes may be required. Accordingly, it is impossible to use the technology according to a related art for real-time visual recording.

Recovering of a damaged image according to a related art may require a considerable amount of hardware for the technical application. A technology requiring a normal image similar to a damaged image, or technologies requiring information other than an input image to recover a single image, for example a technology requiring a plurality of damaged images captured at various angles, a technology requiring an image damaged by various exposures, and the like, may require a considerable amount of time and a considerable amount of hardware.

DISCLOSURE OF INVENTION

Technical Solutions

In one general aspect, there is provided an image recovery device including: an input unit to receive an input image; a damaged image detection unit to detect an image damaged by a weather phenomenon from the input image; a damaged image recovery unit to recover the damaged image; and an output unit to output the recovered image, wherein the damaged image recovery unit recovers at least one of a contrast and color of the damaged image.

In another general aspect, there is provided an image recovery method including: receiving, by an input unit, an input image; verifying, by a damaged image detection unit, at least one of a brightness value distribution and an edge component of the input image, and detecting a damaged image from the input image; recovering, by a damaged image recovery unit, the damaged image; and outputting, by an output unit, the recovered image, wherein the recovering comprises recovering at least one of a contrast and color of the damaged image.

Effects of the Invention

According to an embodiment of the present invention, when an input image is determined to be damaged by a weather environment, for example fog, yellow dust, and the like, by determining a state of the input image, the input image may be recovered and thus, it is possible to increase visibility in the input image.

According to an embodiment of the present invention, it is possible to obtain a clear image regardless of a weather environment, for example fog, yellow dust, and the like, by recovering a contrast and color of an image damaged by the weather environment.

According to an embodiment of the present invention, a main purpose for acquiring an image may be achieved by obtaining a clear image regardless of a weather environment and thus, it is possible to induce a normal operation of other additional functions.

DETAILED DESCRIPTION FOR CARRYING OUT THE INVENTION

Figure 1:
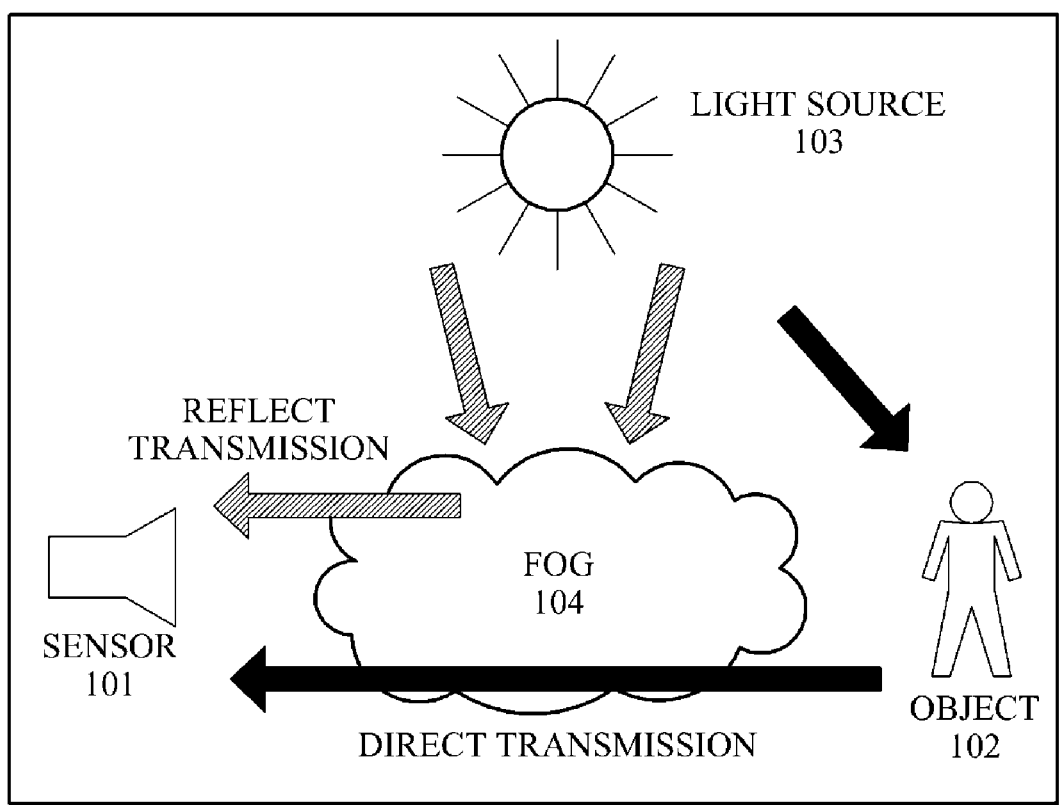
FIG. 1 illustrates an example of modeling a process of inputting light to a camera in a foggy situation.

Hereinafter, embodiments of the present invention will be further described with reference to the accompanying drawings.

When it is determined detailed description related to a related known function or configuration they may make the purpose of the present invention unnecessarily ambiguous in describing the present invention, the detailed description will be omitted here. Also, terminologies used herein are defined to appropriately describe the embodiments of the present invention and thus may be changed depending on a user, the intent of an operator, or a custom of a field to which the present invention pertains. Accordingly, the terminologies must be defined based on the following overall description of this specification. Like reference numerals illustrated in the drawings refer to like constituent elements throughout the specification.

Figure 2:
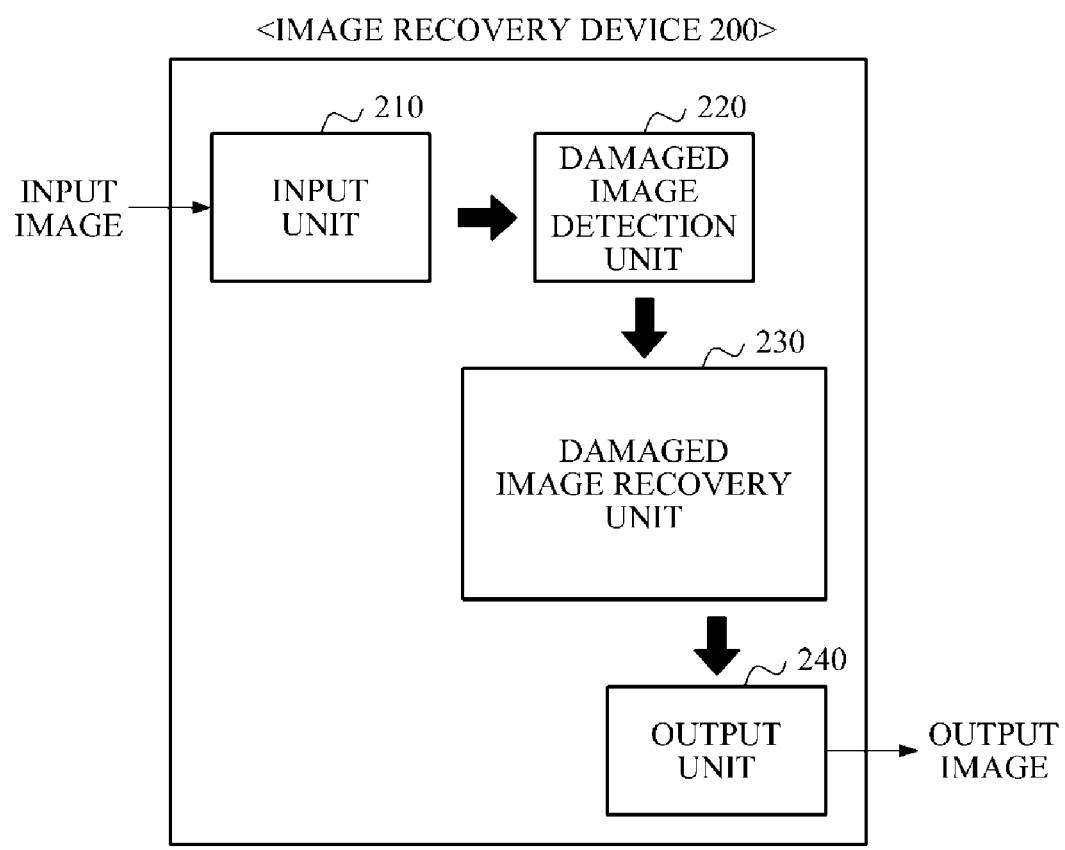
FIG. 2 is a block diagram illustrating a configuration of an image recovery device according to an embodiment of the present invention.

FIG. 2 is a block diagram illustrating a configuration of an image recovery device 200 according to an embodiment of the present invention.

A damaged image may refer to an image with a visibility reduced due to weather phenomena, for example, fog, yellow dust, and the like. In an image with a poor visibility, it may be difficult to clearly identify a shape of an object, and to accurately perceive the object due to a muddy color.

The image recovery device 200 may search for an image damaged by weather phenomena, for example fog, yellow dust, and the like, and may recover the image. Images damaged by weather phenomena, for example fog, yellow dust, and the like, may have poor visibility due to a low contrast, and muddy colors. Accordingly, it may be difficult to properly recognize the images.

The image recovery device 200 may recover the damaged image, and may obtain a clear image with good visibility. This may be applied to all camera application technologies, and may be used. Additionally, a performance of other application technologies of a camera, for example movement detection, image stabilization, and the like, may be maintained regardless of weather phenomena.

To recover a damaged image, the image recovery device 200 may include an input unit 210, a damaged image detection unit 220, a damaged image recovery unit 230, and an output unit 240.

The input unit 210 may receive an input image captured by a capturing device.

The damaged image detection unit 220 may detect an image damaged by weather phenomena from the input image.

The damaged image detection unit 220 may verify at least one of a variety of information, for example, an average brightness value, a standard deviation, airlight, a brightness value distribution, an edge component, and the like of the input image, and may detect the damaged image. In other words, the damaged image detection unit 220 may verify an average brightness value, a standard deviation, airlight, a color-difference signal vector magnitude, a brightness value distribution, an edge component, and the like of the input image, and may determine whether the image is damaged.

A value of the airlight may be obtained using Equation 1 modified to apply, in real time, an airlight estimation scheme used in "Enhancement of Image Degraded by Fog Using Cost Function Based on Human Visual Mode", D. Kim, IEEE 2008. An ideal image used in Equation 1 refers to an image that uses an entire representation range of the image and that has a uniform distribution with an average of "(maximum value−minimum value/2."

$$Airlight = \text{MEAN}(I) - \sqrt{\frac{STD(I)}{\left(\frac{STD(\text{Ideal})}{\text{MEAN}(\text{Ideal})}\right)}} \quad \text{[Equation 1]}$$

I: Input Image
Ideal: Ideal Image

Additionally, the damaged image detection unit 220 may verify components of the input image. When at least one condition for a threshold of each of the verified components is satisfied, the damaged image detection unit 220 may detect the damaged image from the input image.

In an example, when a number of edge components that have values equal to or greater than a constant threshold among edge components of a specific image is equal to or less than a threshold for a number of the edge components, the damaged image detection unit 220 may detect the specific image as a damaged image from the input image.

In another example, the damaged image detection unit 220 may verify the condition of a specific image. When the condition is beyond a selected threshold range, the damaged image detection unit 220 may detect the specific image as a damaged image from the input image.

In still another example, when a color-difference signal vector magnitude of a specific image is equal to or less than a threshold, based on a vector scope, the damaged image detection unit 220 may detect the specific image as a damaged image from the input image.

Furthermore, the damaged image detection unit 220 may verify a preset region of interest (ROI), and may determine whether a specific image corresponding to the preset ROI is damaged. When the specific image is determined to be damaged, the damaged image detection unit 220 may detect the specific image as a damaged image from the input image.

In an example, when an average brightness value of a specific image is equal to or greater than a selected threshold, the damaged image detection unit 220 may detect the specific image as a damaged image from the input image.

In another example, when a standard deviation value of a specific image is included in a selected threshold range, the damaged image detection unit 220 may detect the specific image as a damaged image from the input image.

In still another example, when an airlight value of a specific image is equal to or greater than a selected threshold, the damaged image detection unit 220 may detect the specific image as a damaged image from the input image.

Hereinafter, a normal image, and an image damaged by fog will be described.

Figure 3:
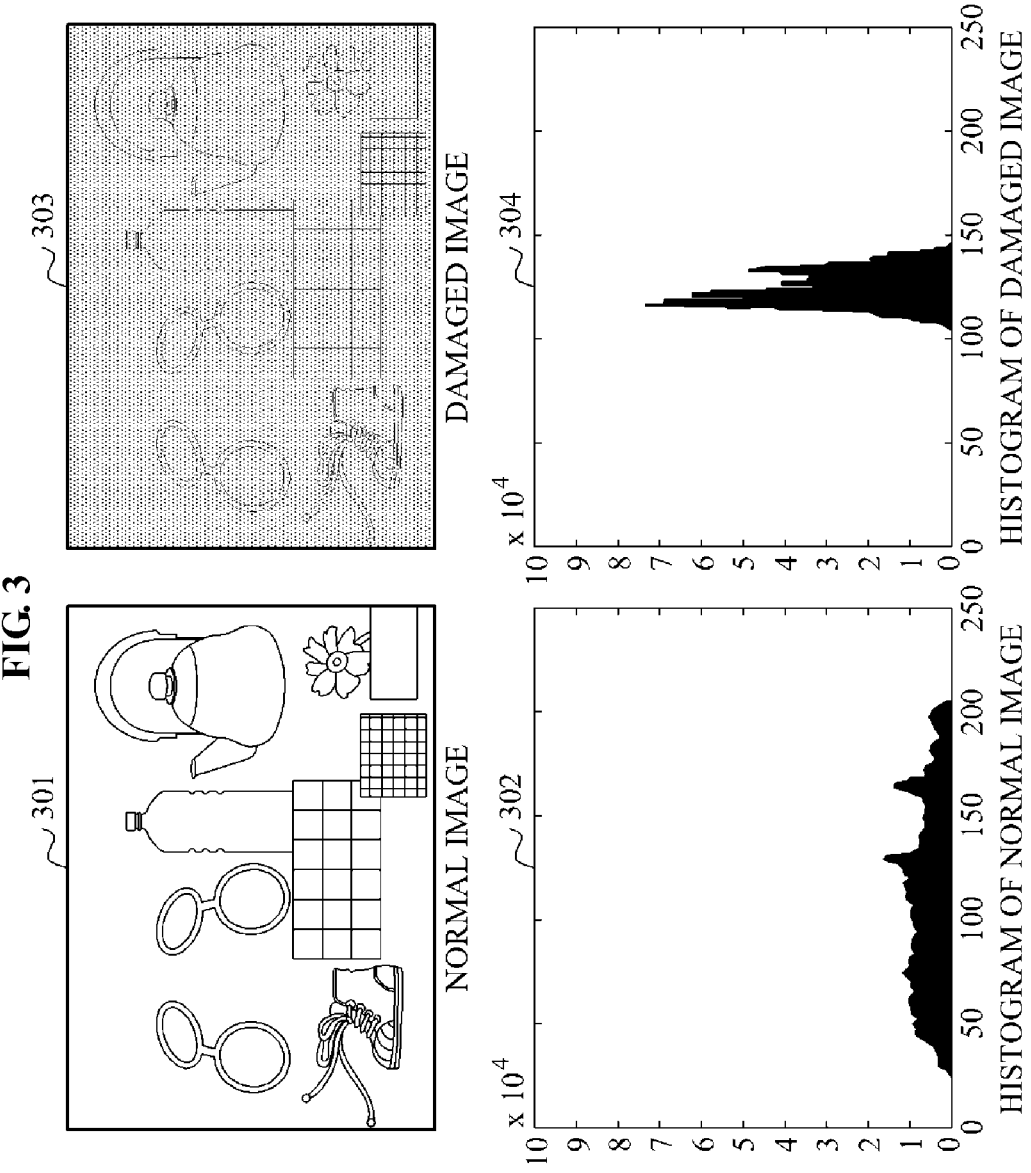
FIG. 3 illustrates a difference between a normal image and a fog image.

FIG. 3 illustrates a difference between a normal image and a fog image.

FIG. 3 illustrates a normal image 301 that is not affected by a weather condition, and an image 303 damaged by fog.

A histogram 302 of the normal image 301 represents a uniform distribution, and colors are clear. Conversely, a histogram 304 of the damaged image 303 represents a non-uniform distribution, and colors are muddy.

Additionally, a range of the histogram 304 is narrower than a range of the histogram 302.

Referring back to FIG. 2, the damaged image recovery unit 230 may recover the damaged image.

For example, the damaged image recovery unit 230 may perform image processing based on at least one of a contrast and color of the damaged image, and may recover the damaged image.

The damaged image recovery unit 230 may redistribute brightness values of the damaged image, to recover a low contrast of the damaged image.

The above method may require relatively less hardware, and may quickly and sufficiently recover the contrast. Additionally, for redistribution, the damaged image recovery unit 230 may reset a brightness value distribution of the damaged image through at least one of stretching and histogram equalization, and may recover the damaged image.

In an example, the damaged image recovery unit 230 may expand a brightness value distribution of the damaged image at a ratio equal to or greater than a constant ratio, and may recover the damaged image.

As described with reference to FIG. 2, the histogram 304 of the damaged image 303 represents the non-uniform distribution and a narrow width. By increasing the narrow width at a ratio equal to or greater than a constant ratio, a portion of the damaged image 303 may be recovered.

In another example, the damaged image recovery unit 230 may stretch the brightness value distribution of the damaged image, or may perform histogram equalization, and may recover the damaged image 303.

In still another example, the damaged image recovery unit 230 may remove an effect of a weather environment based on modeling of the weather environment, and may recover the damaged image.

In other words, a reflect transmission, that is, light emitted from a light source and reflected from fog including fine particles in air may be determined as the effect of the weather environment, may remove the reflect transmission from the damaged image, and may recover the damaged image.

In yet another example, the damaged image recovery unit 230 may remove an effect of a weather environment from the damaged image, and may amplify an original color of the damaged image, to recover a muddy color.

Specifically, the damaged image recovery unit 230 may remove an effect of a weather environment, for example fog, yellow dust, and the like, based on modeling of the weather environment. The damaged image recovery unit 230 may recover all color components of the damaged image by strengthening color components weakened by the weather environment.

In a further example, the damaged image recovery unit 230 may amplify each of color components of the damaged image at a ratio equal to or greater than a constant ratio, and may recover the damaged image.

The above technologies of processing colors through the amplification and the removal of the effect of the weather environment may be independently performed, and a user may determine whether to use the technologies. Additionally, a modeling scheme used to remove a weather environment effect may be used by modifying schemes of existing articles to be operated in real time.

To amplify a color component, an appropriate gain may be multiplied by a color signal.

In a further example, the damaged image recovery unit 230 may sequentially recover a contrast and color of the damaged image.

Due to low contrasts and muddy colors of images damaged by weather phenomena, an overall recovery process may be divided into a contrast recovery and a color recovery, and contrasts and colors of the damaged images may be sequentially recovered.

The damaged image recovery unit 230 may allow brightness values in a narrow range, for example damaged images, to be re-distributed to a wide range, during a contrast processing process. Accordingly, a contrast of an image may be increased and thus, visibility of the image may be increased.

The damaged image recovery unit 230 may remove an influence of a weather environment from distorted color components of a damaged image during a color recovery process, and may strengthen the distorted color components. In other words, the influence of the weather environment may be removed by analyzing color components of an input image, and the color components may be recovered by amplifying a color signal. By recovering the color components, visibility of the image may be significantly increased.

Sequentially recovering of a contrast and color of an image may have an advantage, in comparison to simultaneously recovering of a contrast and color of an image. The image may be recovered by applying an optimized level for each operation and accordingly, an image recovery result may less fluctuate based on various images, and a clear image may be acquired.

The damaged image recovery unit 230 may simultaneously process a contrast recovery and a color recovery, to recover a damaged image. A contrast recovery scheme may be applied to each of R, G, and B channels. Accordingly, a contrast and color may be simply recovered, instead of an additional color processing operation being performed.

For example, the damaged image recovery unit 230 may simultaneously recover a contrast and color of an image by applying at least one of stretching and histogram equalization to each color component.

The damaged image recovery unit 230 may verify a damage intensity of the detected damaged image, may determine a recovery level of the damaged image based on the verified damage intensity, and may recover the damaged image based on the determined recovery level.

Additionally, the damaged image recovery unit 230 may blend an original image and a recovered image by adjusting a ratio based on a distance from a boundary of a preset ROI, and may recover an image corresponding to the preset ROI so that a boundary of the recovered image may be smoothly displayed.

In other words, the damaged image recovery unit 230 may recover an image damaged by weather phenomena by applying a level suitable for a damage intensity based on information obtained by detecting the damaged image. The above scheme may have many advantages in comparison to a technology of applying the same level regardless of a damage intensity.

An automatic level adjustment function may not be used based on user's convenience. After an automatic level adjustment, a level may be additionally adjusted based on a user's taste.

When a system for detecting an image damaged by weather phenomena does not exist, and when a damage occurs due to a weather, a user may manually adjust a function. Additionally, because images have different damage intensities, a user may need to manually adjust an application intensity of a function based on different damage intensities, which may cause the user to feel inconvenience.

The image recovery device 200 may analyze an input image from various perspectives, may determine whether the input image is damaged by weather phenomena, and may recognize a damage intensity when the input image is determined to be damaged. Accordingly, the image recovery device 200 may be used as a system for warning and notifying of a weather change and an automatic level adjustment of a proposed technology.

The output unit 240 may output the recovered image.

Figure 4:
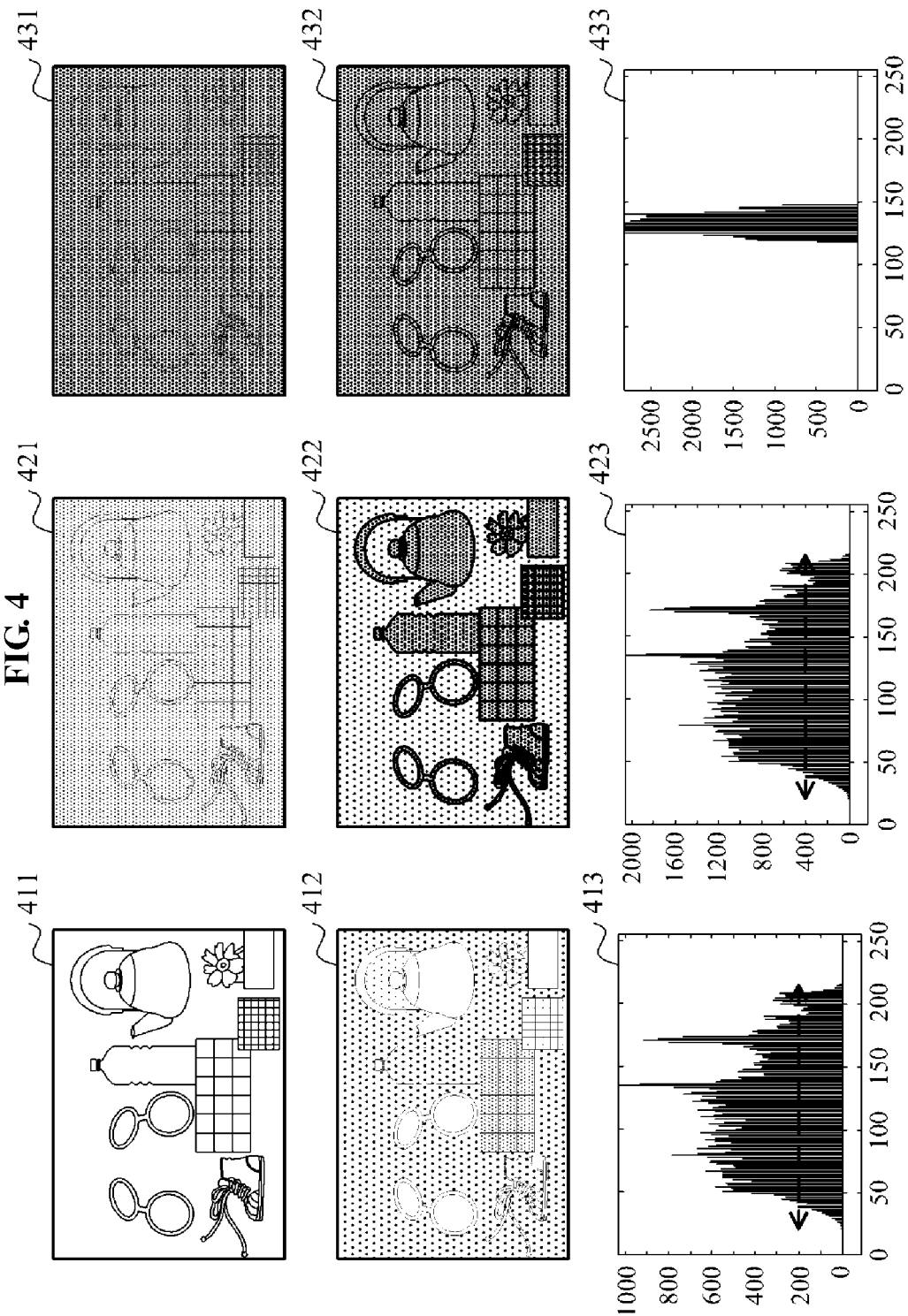
FIG. 4 illustrates features of damaged images based on an intensity of a weather environment.

FIG. 4 illustrates features of damaged images based on an intensity of a weather environment.

In a left column of FIG. 4, images 411, 412, and 413 are shown. The image 411 may not be damaged by a weather environment, the image 412 may represent an edge component of the image 411, and the image 413 may represent a histogram analysis result.

In a middle column of FIG. 4, images 421, 422, and 423 are shown. The image 421 may be damaged by a weather environment, the image 422 may represent an edge component of the damaged image 421, and the image 423 may represent a histogram analysis result.

In a right column of FIG. 4, images 431, 432, and 433 are shown. The image 431 may be damaged by a bad weather environment, the image 432 may represent an edge component of the damaged image 431, and the image 433 may represent a histogram analysis result.

The images 412, 422, and 432 in a middle row of FIG. 4 may be edge images obtained by applying a 3×3 Kirsch filter to the images 411, 421, and 431, respectively. When weather phenomena are deteriorated, a number of edge components of an image may be reduced.

The histogram analysis images 413, 423, and 433 are shown in a bottom row of FIG. 4. Accordingly, non-uniformity of a histogram distribution of an image may be significantly reduced, when weather phenomena are deteriorated.

The damaged image detection unit 120 may classify information of an input image into a normal image and a weather environment image representing a weather environment, for example fog, yellow dust, and the like, using Equation 2.

$$\begin{aligned} \text{Fog On} = \ & (\text{Condition 1} < \text{Thresholds of Condition 1}) \\ & \& \\ & (\text{Condition 2} > \text{Thresholds of Condition 2}) \\ & \& \\ & \cdots \\ & \& \\ & (\text{Condition } N < \text{Thresholds of Condition } N) \end{aligned} \quad \text{[Equation 2]}$$

Herein, 'Fog On' denotes an AND operation result value for each condition, that is, a distinguishment result of images based on fog, yellow dust, and the like. 'Condition 1, 2, . . . , N' denote conditions required to distinguish images based on fog, yellow dust, and the like, and information of an input image. 'Thresholds of Condition 1, 2, . . . , N' denote thresholds for image distinguishment conditions of fog, yellow dust, and the like. Conditions may include, for example, an average brightness value, a standard deviation, airlight, a color-difference signal vector magnitude, a brightness value distribution, an edge component, and the like.

Figure 5:
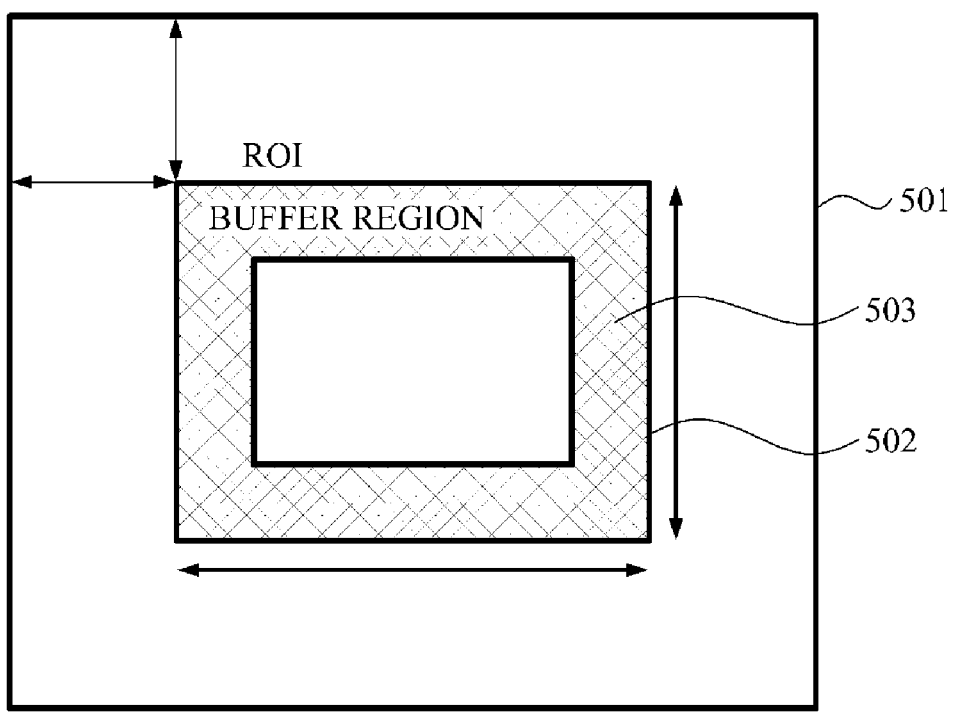
FIG. 5 illustrates an example in which a region of interest (ROI) is selected from an input image and an image damaged by a weather environment is detected.

FIG. 5 illustrates an example in which a damaged image detection unit selects a ROI from an input image, and detects an image damaged by a weather environment and the damaged image is recovered according to an embodiment of the present invention.

A damaged image detection unit according to an embodiment of the present invention may verify a ROI 502 set in advance in an input image 501, may determine whether a specific image corresponding to the ROI 502 is damaged, and may detect the specific image as a damaged image when the specific image is determined to be damaged.

Weather phenomena, for example fog, yellow dust, and the like, may not appear over all regions of an image at all times, and an important ROI 502 requiring a sensitive reaction may be determined based on users. Additionally, setting of the ROI 502 and detecting and recovering of the ROI 502 may be more advantageous than detecting and recovering of a portion of regions on which weather phenomena appear.

When weather phenomena appears over the entire image, or when a uniform distribution is not shown, it may be difficult to accurately detect weather phenomena appearing on a portion of the image 501, and to obtain an intensity of the weather phenomena. Accordingly, the damaged image may not be properly recovered. When the ROI 502 is set, weather phenomena appearing in an image may be accurately detected, and an intensity of the weather phenomena may be obtained. Additionally, it is possible to accurately recover a ROI.

When the ROI 502 of the image 501 is detected and recovered, a boundary of the ROI 502 may be exposed to the image 501. This may be unnatural during recovery of weather phenomena partially appearing in the image 501. This may be represented naturally through a buffer region 503. The buffer region 503 may blend an original image and a recovered image by adjusting a ratio using an alpha blending scheme based on a position. Accordingly, the ROI 502 may be naturally recovered. A size of the buffer region 503 may be set by a user.

Figure 6:
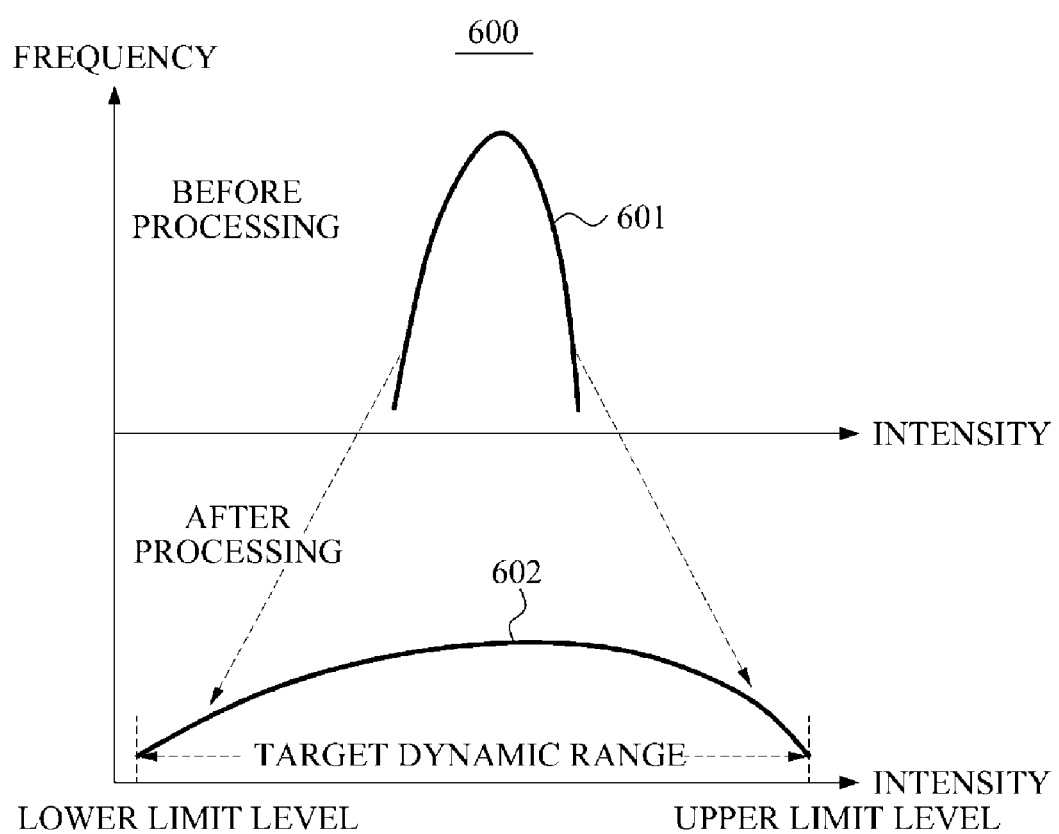
FIG. 6 illustrates a characteristic of image processing for a contrast.

FIG. 6 is a graph 600 illustrating a characteristic of image processing for a contrast.

As indicated by reference numeral 601, brightness values in a histogram of an image representing weather phenomena, for example fog, yellow dust, and the like, may be extremely concentrated in a narrow region.

An image recovery device according to an embodiment of the present invention may redistribute brightness values extremely concentrated in a narrow region to a wider specific region, as indicated by reference numeral 602, through a proposed contrast recovery process. Accordingly, a contrast may be increased, and a viewing distance in an image may be increased.

A target dynamic range may be a dynamic range of an image of which a contrast is to be recovered, and may have a value greater than a value of a dynamic range of an image representing weather phenomena, for example fog, yellow dust, and the like.

An upper limit level may be an upper limit of a brightness value of an image of which a contrast is to be recovered. The upper limit level may be used to prevent an image to be recovered from being extremely saturated.

A lower limit level may be a lower limit of a brightness value of an image of which a contrast is to be recovered. The lower limit level may be used to prevent an image to be recovered from being extremely darkened.

The image recovery device may automatically set the upper limit level and the lower limit level, based on an intensity of damage by weather phenomena.

Additionally, the image recovery device may apply a general technology, for example stretching, histogram equalization, and the like, within a target dynamic range to a redistribution process in a contrast recovery processing process.

Figure 7:
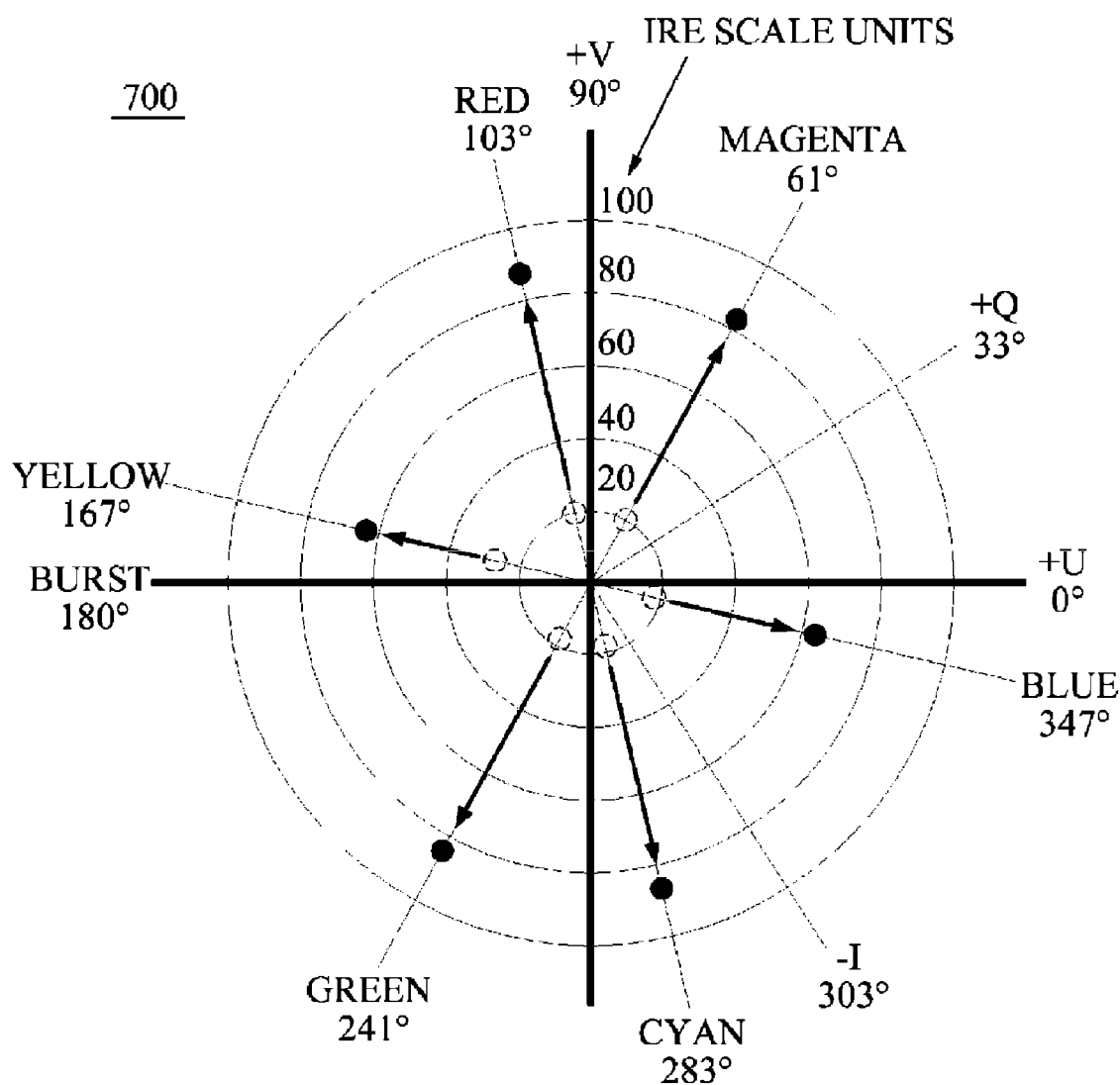
FIG. 7 illustrates a characteristic of image processing for colors.

FIG. 7 illustrates a characteristic of image processing for colors.

A graph 700 of FIG. 7 shows a characteristic of a color processing technology using a vector scope.

When a color-difference signal vector magnitude of an image is equal to or less than a threshold, a damaged image detection unit according to an embodiment of the present invention may detect the image as a damaged image from an input image.

Because each of color components of the damaged image affected by weather phenomena, for example fog, yellow dust, and the like, is weakened due to a weather environment effect, a color-difference signal vector magnitude may be reduced. The color components may be amplified and recovered.

Because an image affected by weather phenomena, for example fog, yellow dust, and the like, is input to an image due to an addition of light reflected by fine particles in air as shown in FIG. 1, color components of the image may be weaker than those of a normal image. Accordingly, it may be difficult to accurately recognize and perceive a color of an object in the image, which may reduce visibility of the image.

A damaged image recovery unit according to an embodiment of the present invention may remove an effect of weather phenomena, for example fog, yellow dust, and the like, and may amplify a weakened color signal.

The damaged image recovery unit may remove the effect of the weather phenomena, using Equations 3 to 6. The above method is described in "Visibility Enhancement for Roads with Foggy or Hazy Scenes," R. Tan, IEEE 2007. Equation 4 may be modified for real-time processing.

In a scheme of amplifying a color signal, a color signal may be amplified by a multiplication scheme of a color-difference signal vector magnitude, and the like.

The damaged image recovery unit may independently operate to remove the effect of the weather phenomena, and to amplify a weakened color signal, and may be selected and used based on an intensity of the weather phenomena and a user's taste.

$$O\_C_{(r,g,b)} = (I\_C_{(r,g,b)} - C_{(r,g,b)}\_\text{Gain}^* Y^* \text{Gamma}\_C_{(r,g,b)})^* \text{Depth} \quad \text{[Equation 3]}$$

$$\text{Gamma}\_C_{(r,g,b)} = (C_{(r,g,b)-max} - C_{(r,g,b)-min})/((\text{MAX}(R+G+B) - \text{MIN}(R+G+B)) \quad \text{[Equation 4]}$$

$$\text{Depth} = Y\_\text{MAX}/(Y\_\text{MAX}-Y) \quad \text{[Equation 5]}$$

$$Y = 0.257^*(i\_R/\text{Gamma}\_R) + 0.504^*(i\_G/\text{Gamma}\_G + 0.098^*(i\_B/\text{Gamma}\_B) \quad \text{[Equation 6]}$$

Figure 8:
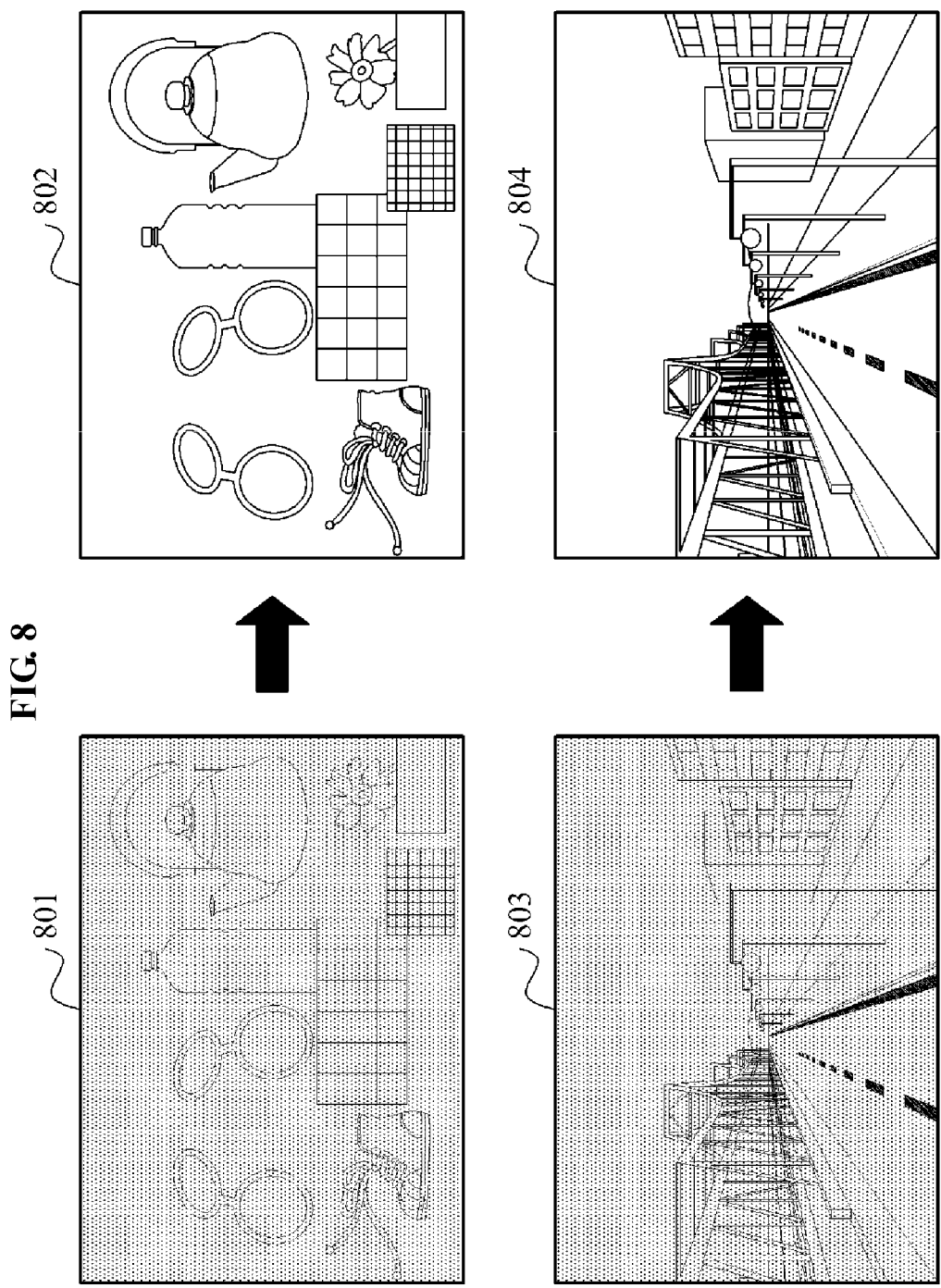
FIG. 8 illustrates an example of recovery of a damaged image using an image recovery device according to an embodiment of the present invention.

FIG. 8 illustrates an example of recovery of a damaged image using an image recovery device according to an embodiment of the present invention.

As shown in FIG. 8, images 801 and 803 damaged by a weather environment, for example fog, yellow dust, and the like, may be reset as images 802 and 804 recovered by an image recovery device according to an embodiment of the present invention.

As described above, according to an embodiment of the present invention, when an input image is determined to be damaged by a weather environment, for example fog, yellow dust, and the like, by determining a state of the input image, the damaged image may be recovered and thus, it is possible to increase visibility in the input image.

Additionally, according to an embodiment of the present invention, a contrast and color of an image damaged by a weather environment, for example fog, yellow dust, and the like, may be recovered and thus, it is possible to obtain a clear image regardless of the weather environment.

Furthermore, according to an embodiment of the present invention, a main purpose for acquiring an image may be achieved by obtaining a clear image regardless of a weather environment and thus, it is possible to induce a normal operation of other additional functions.

Figure 9:
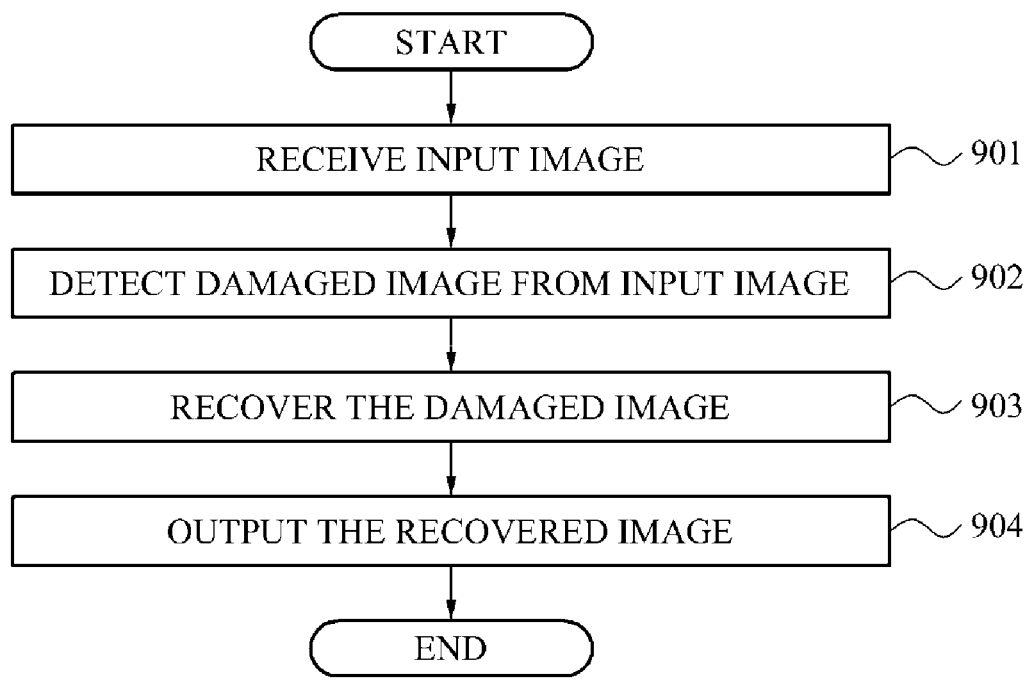
FIG. 9 is a flowchart illustrating an image recovery method according to an embodiment of the present invention.

FIG. 9 is a flowchart illustrating an image recovery method according to an embodiment of the present invention.

The image recovery method may receive an input image in operation 901, may verify at least one of a brightness value distribution and an edge component of the input image, and may detect a damaged image from the input image in operation 902.

The image recovery method may recover the damaged image in operation 903, and may output the recovered image using an output unit in operation 904.

To recover the damaged image, the image recovery method may recover at least one of a contrast and color of the damaged image.

In an example, the image recovery method may expand a brightness value distribution of the damaged image at a ratio equal to or greater than a constant ratio, and may recover the damaged image.

In another example, the image recovery method may reset a brightness value distribution of the damaged image through at least one of stretching and histogram equalization, and may recover the damaged image.

In still another example, the image recovery method may remove an effect of a weather environment based on modeling of the weather environment, and may recover the damaged image.

In yet another example, the image recovery method may amplify each of color components of the damaged image at a ratio equal to or greater than a constant ratio, and may recover the damaged image.

The image recovery method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. An image recovery device, comprising:
at least one processor; and
a memory storing instructions that, when executed by the at least one processor, cause the at least one processor to perform:
receiving an input image;
detecting an image damaged by a weather phenomenon from the input image;
recovering the damaged image; and
outputting the recovered image,
wherein the recovering comprises recovering at least one of a contrast and color of the damaged image, and
wherein the recovering further comprises blending an original image and the recovered image by adjusting a ratio on a distance from a boundary of a preset region of interest (ROI).

2. The image recovery device of claim 1, wherein the detecting comprises verifying at least one of a brightness value distribution and an edge component of the input image, and detecting the damaged image from the input image.

3. The image recovery device of claim 1, wherein the detecting comprises verifying components of the input image, and detecting the damaged image from the input image when at least one condition for a threshold of each of the verified components is satisfied.

4. The image recovery device of claim 3, wherein the detecting comprises detecting a specific image corresponding to the ROI in the input image as the damaged image when a number of edge components that have values equal to or greater than a constant threshold among edge components of the specific image, is equal to or less than a threshold for a number of the edge components.

5. The image recovery device of claim 3, wherein the detecting comprises detecting a specific image corresponding to the ROI in the input image as the damaged image when a brightness value distribution of the specific image is equal to or less than a selected threshold.

6. The image recovery device of claim 3, wherein the detecting comprises detecting a specific image corresponding to the ROI in the input image as the damaged image when an average brightness value of the specific image is equal to or greater than a selected threshold.

7. The image recovery device of claim 3, wherein the detecting comprises detecting a specific image corresponding to the ROI in the input image as the damaged image when a standard deviation value of the specific image is included in a selected threshold range.

8. The image recovery device of claim 3, wherein the detecting comprises detecting a specific image corresponding to the ROI in the input image as the damaged image when an airlight value of the specific image is equal to or greater than a selected threshold.

9. The image recovery device of claim 2, wherein the detecting comprises detecting a specific image corresponding to the ROI in the input image as the damaged image when a color-difference signal vector magnitude of the specific image is equal to or less than a threshold.

10. The image recovery device of claim 2, wherein the recovering further comprises expanding a brightness value distribution of the damaged image at a ratio equal to or greater than a constant ratio, and recovering the damaged image.

11. The image recovery device of claim 2, wherein the recovering further comprises resetting a brightness value distribution of the damaged image through at least one of stretching and histogram equalization, and recovering the damaged image.

12. The image recovery device of claim 2, wherein the recovering further comprises removing an effect of a weather environment based on modeling of the weather environment, and recovering the damaged image.

13. The image recovery device of claim 2, wherein the recovering further comprises amplifying each of color components of the damaged image at a ratio equal to or greater than a constant ratio, and recovering the damaged image.

14. The image recovery device of claim 1, wherein the detecting comprises verifying the preset ROI and determining whether a specific image corresponding to the preset ROI is damaged, and detecting the specific image as the damaged image when the specific image is determined to be damaged.

15. The image recovery device of claim 1, wherein the recovering further comprises recovering the damaged image corresponding to the preset ROI when the preset ROI is detected to be damaged.

16. The image recovery device of claim 1, wherein the recovering further comprises simultaneously recovering a contrast and color of the damaged image through at least one of stretching and histogram equalization.

17. The image recovery device of claim 1, wherein the recovering further comprises sequentially recovering a contrast and color of the damaged image.

18. The image recovery device of claim 1, wherein the recovering further comprises verifying a damage intensity of the damaged image, determining a recovery level of the damaged image based on the verified damage intensity, and recovering the damaged image based on the determined recovery level.

19. An image recovery method, comprising:
receiving an input image;
verifying at least one of a brightness value distribution and an edge component of the input image, and detecting an image damaged by a weather phenomenon from the input image;
recovering the damaged image; and
outputting the recovered image,
wherein the recovering comprises recovering at least one of a contrast and color of the damaged image, and
wherein the recovering further comprises blending an original image and the recovered image by adjusting a ratio based on a distance from a boundary of a preset region of interest (ROI).

20. A non-transitory computer readable recording medium storing a program to cause a computer to implement the method of claim 19.

* * * * *